Oct. 1, 1968     N. C. KOESTER     3,403,556
FLOW MEASURING DEVICE
Filed July 13, 1966
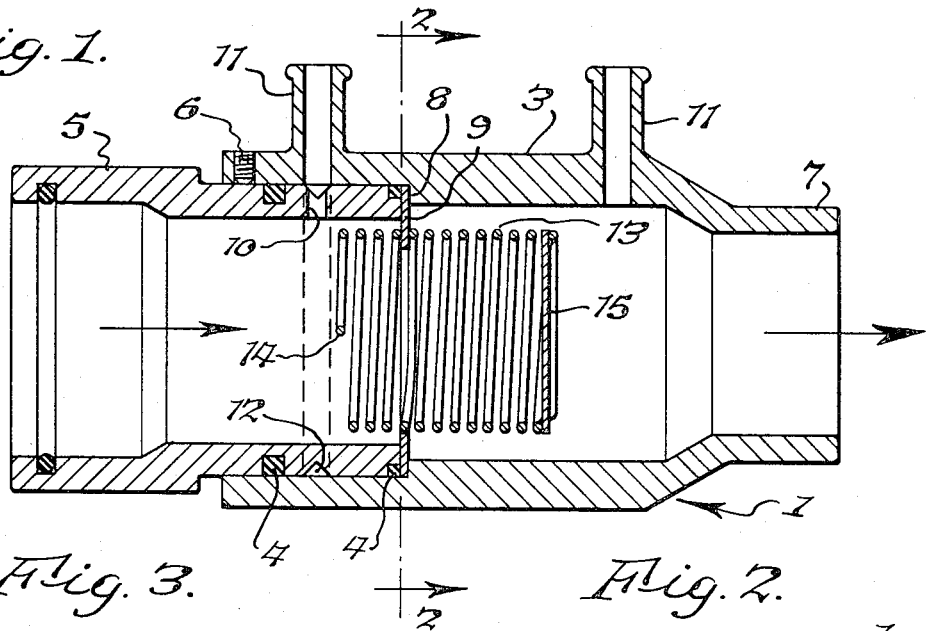
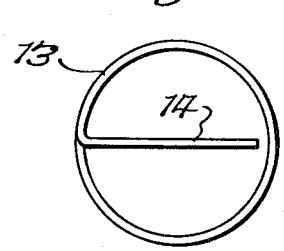
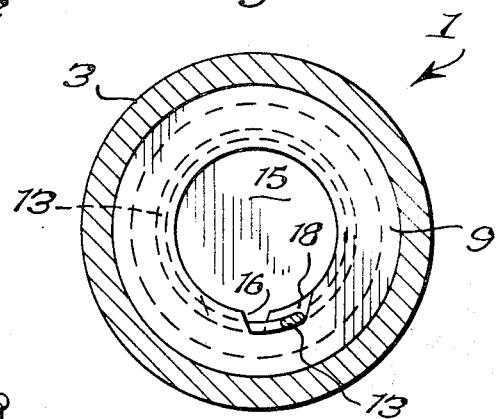
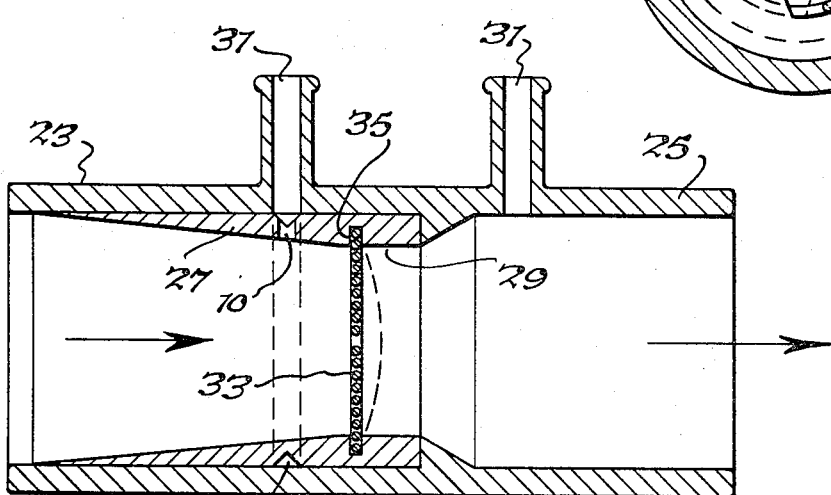
INVENTOR.
Norman C. Koester
BY
Christel & Bean
ATTORNEYS.

3,403,556
FLOW MEASURING DEVICE
Norman C. Koester, Lancaster, N.Y., assignor, by mesne assignments, to "Automatic" Sprinkler Corporation, Cleveland, Ohio, a corporation of Ohio
Filed July 13, 1966, Ser. No. 564,981
8 Claims. (Cl. 73—207)

ABSTRACT OF THE DISCLOSURE

A coil spring providing a flow passage through its convolutions flexes in response to variations in pressure differential between the upstream and downstream portions, thereby varying the flow passage area in accordance with the flow rate therethrough.

---

This invention relates to the flow measuring art, and in particular to a flow meter of the restricted orifice type having a variable area orifice adapted to measure rate of flow throughout a wide range of volumetric flow rates.

Generally, the capacity of flow meters to measure both high and low volumetric flow rates is severely limited and conventional flow meters measure flow rates effectively only within a relatively small range of maximum and minimum volumetric flow rates. Flow rate measurement, in a particular application, depends on an estimate of the flow rate and the choice of a flow meter having a measuring range including such estimate. Thus, continuous volumetric flow rate measurements in flow conduits having varying volumetric flow rates throughout a wide range heretofore would often not be obtained utilizing a single flow meter.

Moreover, many flow meters have non-linear responses when operating close to the maximum or minimum designed range giving inaccurate flow rate measurements at these points. Additionally, some flow meters become clogged by particles entrained in the flow adhering to the working surfaces thereof, causing inaccurate volumetric flow rate measurements.

In the restricted orifice type of flow meter, to provide a pressure differential across the orifice capable of meaningful measurement on a manometer or a differential pressure gauge, a large volume flow rate requires a corresponding large orifice and a small volume flow rate requires a small orifice. A low volumetric flow rate with a large orifice produces a negligible pressure differential requiring an extremely accurate and often more complex pressure differential gauge. Conversely, a large volumetric flow rate with a small orifice increases the back pressure to an extent such that the pressure differential no longer reflects the true volumetric rate of flow. The ideal condition therefore approximates an orifice area in direct proportion to the volumetric flow rate.

Accordingly, a primary object of the present invention is to provide a flow meter having a variable area orifice responsive to the volume rate of flow thereby adapting the flow meter for flow rate measurements over a significantly wider range of flow rates. In a preferred form of my invention, this is accomplished by the provision of a helically wound spring supported internally of a flow conduit for flexing axially in the direction of flow to vary the spacing between the spring convolutions, such spacing constituting a variable orifice through which the flow passes.

It is also an object of the present invention to provide a variable orifice area flow meter having a substantially linear response throughout the measuring range thereof.

It is another object of the present invention to provide a variable orifice area flow meter which is self-cleaning and will continuously remain free of clogging material.

A further object of the present invention is to provide a variable orifice area flow meter having means for adjusting the orifice area for a given pressure differential to provide greater accuracy in pressure measurement during anticipated large or small flow rates.

Various other novel details of construction and advantages inherent in the flow meter construction of the present invention are pointed out in detail in conjunction with the following description and accompanying drawing of two typical embodiments of the invention. It is to be understood that such embodiments are by way of example only and to illustrate the principles of the present invention, the scope of which is limited only as defined in the appended claims.

In the drawing:

FIG. 1 is a vertical longitudinal sectional view of a flow meter made in accordance with the present invention;

FIG. 2 is a transverse sectional view thereof, taken about on line 2—2 of FIG. 1;

FIG. 3 is an end elevational view of the orifice spring from the upstream side thereof; and FIG. 4 is a vertical longitudinal sectional view of another embodiment of my invention.

Referring now to FIGS. 1 and 2 of the drawing, there is shown a flow meter of my invention, generally designated 1. Flow meter 1 comprises a tubular housing 3 having a bore therethrough and a sleeve 5 telescopingly received within an enlarged diametral portion of the bore at one end of housing 3. Flow meter 1 is adapted for insertion in a fluid line, not shown, with the left side thereof, as seen in FIG. 1, being the input and the reduced diameter portion 7 on the right side thereof, as seen in FIG. 1, forming an outlet. An annular plate 9 is secured within flow meter 1 between the inner end of sleeve 5 and an internal shoulder 8 formed on housing 3 by the enlarged bore portion thereof, sleeve 5 being suitably seated and secured within housing 3 and against plate 9 by sealing gaskets 4 and set screw 6 respectively. Plate 9 has a central opening passing axially therethrough of a size sufficient to cause a measurable pressure drop across the plate as more fully described hereinafter.

Conventional pressure measuring taps 11 communicate through the wall housing 3 with the fluid passage on opposite sides of plate 9, the tap on the upstream side thereof communicating with the flow passage through a hole 10 in sleeve 5. Sleeve 5 has an external annular groove 12 forming with housing 3 a conduit providing communication between upstream tap 11 and hole 10 in the event of radial misalignment therebetween. Taps 11 communicate with manometers or a pressure gauge, not shown, calibrated to translate the pressure drop across plate 9 into volume of flow per unit time. The direction of flow is indicated by arrows in FIGS. 1 and 4. If only the fixed orifice of plate 9 were provided, the flow meter would be accurate only over a limited range. However, it is a particular feature of my invention that the orifice area varies to accommodate variations in rates of flow. This is accomplished by providing a linearly variable, pressure differential element.

In the embodiment of FIGS. 1-3, this is provided by a cylindrical, helically wound spring 13 adjustably mounted on plate 9. Spring 13 has an end wall in the form of a plate or diaphragm 15 secured on the downstream end thereof, closing that end of spring 13. The diameter of spring 13 is slightly larger than the diameter of the opening through plate 9. The inner periphery of plate 9 defining the opening therethrough has a slot 16 with an adjacent chamfered edge 18 as seen in FIG. 2. By passing the upstream end portion 14 of spring 13 through slot 16 and engaging the chamfered edge 18, relative rotation of plate 9 and spring 13 causes the spring convolutions to wind from the downstream side of plate 9 through slot 16 to the upstream side thereof. Spring 13 is, in effect, screwed onto plate 9 and since chamfered edge 18 forms a larger angle with plate 9 than each spring convolution does, the spring frictionally bears against edge 18 and is thereby maintained in the desired axial position relative to plate 9. Therefore, the number of spring convolutions between plate 9 and end plate 15 can be varied and accordingly the number of spaces between adjacent convolutions on the downstream side of plate 9 is likewise varied. The upstream end 14 of spring 13 extends on a diameter, crosswise of the flow passage, and can be grasped by an appropriate tool for rotary adjusting of spring 13 after installation thereof in housing 3.

It is a significant feature of the present invention that the spacings between adjacent spring convolutions on the downstream side of plate 9 constitute an orifice having a variable area, and that such variable area orifice enlarges and contracts in direct proportion to the volumetric flow rate. The spacing between adjacent convolutions on the downstream side of plate 9 enlarges or contracts as spring 13 flexes under the influence of the pressure differential across end plate 15. With high flow rates, the pressure differential increases causing spring 13 to expand axially, thereby increasing the spacing between adjacent convolutions and enlarging the total area of the orifice provided thereby. Conversely, with low flow rates the pressure differential decreases, and spring 13 contracts and decreases the spacing between its convolutions, thereby decreasing the total orifice area. Where the approximate flow rate is known, the spring may be screwed or unscrewed and thereby adjusted axially relative to plate 9 to provide a correspondingly fewer or greater number of convolutions on the downstream side thereof, to provide an initial orifice area and a spring response rate best suited to that flow rate, for extremely accurate measurements.

The embodiment depicted in FIG. 4 comprises a flow meter generally designated 21 having input and outlet sides 23 and 25 respectively. A removable sleeve 27 having smooth and slightly inwardly tapered surfaces provides a restriction 29 within flow meter 21. Pressure measuring taps 31, similar to taps 11 of the previous embodiment, are positioned on opposite sides of restriction 29.

A spring 33, comprising a flat helical coil is positioned transversely within flow meter 21 across restriction 29, being mounted in an interior peripheral slot 35 formed within sleeve 27. Like spring 13 of the preceding embodiment, the spacing between adjacent convolutions of spring 33 constitutes an orifice with the area thereof being self-adjustable in direct proportion to the volumetric flow rate. As the rate of flow increases, the pressure differential across spring 33 increases causing spring 33 to expand in a downstream direction in direct proportion to the volume of flow, as indicated by the broken line showing thereof in FIG. 4. Such expansion of spring 33 causes the spacing between adjacent convolutions to increase with resulting enlargement of the area of the orifice. With lower rates of flow the pressure differential decreases and spring 33 is maintained more planar. In such configuration, spring 33 has very close spacing between adjacent convolutions resulting in an orifice having a small area.

In both embodiments, the pressure difference is continuously measured through taps 11 and 31 and translated into volumetric flow rate measurements by differential pressure gauges or manometers, not shown, in a manner well understood in the art. It will be noted that the restrictions in the flow passages provided by plate 9 and sleeve 27 are sufficiently large that a flow rate measurement may be taken for very large volume rates of flow. The variable area orifice comprising the spacings between the spring convolutions further restricts the flow with the orifice ranging between areas about as large as the area of the restrictions for high volume flow rates and relatively small areas for lower volume flow rates.

Significantly, the spring provides a self-cleaning action. Materials which might tend to clog a flow meter do not normally adhere to the surfaces of the wire forming the springs 13, 33 and the flexing action thereof tends to clear any material which might happen to adhere to such surface.

It is apparent that I have fully accomplished the objects of my invention by providing a self-cleaning, self-adjustable flow meter having a variable area orifice responsive to changes in volumetric flow rates to enlarge or contract the area of the orifice for measuring flow rates over a wide range thereof.

Having fully disclosed and completely described my invention, and its mode of operation, what I claim as new is:

1. A flow meter comprising means providing a fluid flow passage, and means providing a restricted orifice in said passage, said last-named means including a linearly variable pressure differential element automatically operable in response to variations in pressure differential thereacross to correspondingly vary the cross-sectional area of said orifice, wherein said element comprises a coil spring disposed in said flow passage with all of the fluid flowing through said passage flowing through said spring, said spring providing a flow passage through the convolutions thereof and flexing in response to variations in pressure differential between the upstream and downstream portions thereof, thereby varying the area of said flow passage through said spring in accordance with flow rate therethrough.

2. A flow meter comprising means providing a fluid flow passage, and means providing a restricted orifice in said passage, said last-named means including a linearly variable pressure differential element automatically operable in response to variations in pressure differential thereacross to correspondingly vary the cross-sectional area of said orifice, wherein said element comprises a coil spring disposed in said flow passage, said spring providing a flow passage through the convolutions thereof and flexing in response to variations in pressure differential between the upstream and downstream portions thereof, thereby varying the area of said flow passage through said spring in accordance with flow rate therethrough, together with pressure sensing means communicating with said first-mentioned passage upstream and downstream of said element.

3. A flow meter according to claim 2 wherein said spring comprises a helically wound cylindrical spring with the axis thereof extending longitudinally of said flow passage.

4. A flow meter according to claim 3, including means closing the downstream end of said cylindrical spring.

5. A flow meter according to claim 3, wherein said spring is adjustably mounted in said passage intermediate the ends of said spring.

6. A flow meter comprising means providing a fluid flow passage, and means providing a restricted orifice in said passage, said last-named means including a linearly variable pressure differential element automatically operable in response to variations in pressure differential thereacross to correspondingly vary the cross-sectional area of said orifice, wherein said element comprises a coil spring disposed in said flow passage, said spring providing a flow passage through the convolutions thereof and flexing in response to variations in pressure differential between the upstream and downstream portions thereof, thereby varying the area of said flow passage through said spring in accordance with flow rate therethrough, wherein said spring comprises a helically wound cylindrical spring with the axis thereof extending longitudinally of said flow passage, together with mounting means for said spring including a plate extending crosswise of said first mentioned passage and having an opening therethrough providing a restriction in said passage, said plate being engaged between the convolutions of said spring for adjustably mounting said spring intermediate its ends.

7. A flow meter comprising means providing a fluid flow passage, and means providing a restricted orifice in said passage, said last-named means including a linearly variable pressure differential element automatically operable in response to variations in pressure differential thereacross to correspondingly vary the cross-sectional area of said orifice, wherein said element comprises a coil spring disposed in said flow passage, said spring providing a flow passage through the convolutions thereof and flexing in response to variations in pressure differential between the upstream and downstream portions thereof, thereby varying the area of said flow passage through said spring in accordance with flow rate therethrough, wherein said spring is a substantially flat helically wound coil normally disposed substantially in a transverse plane across said first-mentioned flow passage.

8. A flow meter as set forth in claim 2, wherein said means providing a passage comprise a housing having a bore and a sleeve extending into said bore, and wherein said pressure sensing means include a radial passage through the wall of said sleeve, a radial passage through the wall of said housing, and a circumferential passage between said housing and said sleeve, said circumferential and radial passages being alined axially of said meter and said circumferential passage maintaining communication between said radial passages during radial misalinement thereof.

References Cited
UNITED STATES PATENTS 2,941,401 6/1960 Streeter _____ 73—210
2,979,947 4/1961 Main et al. _____ 73—207

RICHARD C. QUEISSER, *Primary Examiner.*

E. D. GILHOOLY, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,403,556            October 1, 1968

Norman C. Koester

It is certified that error appears in the above identified patent and that said Letters Patent are hereby corrected as shown below:

In the heading to the printed specification, line 4, ""Automatic" Sprinkler Corporation" should read -- "Automatic" Sprinkler Corporation of America --.

Signed and sealed this 24th day of February 1970.

(SEAL)
Attest:

Edward M. Fletcher, Jr.            WILLIAM E. SCHUYLER, JR.

Attesting Officer            Commissioner of Patents